US007872965B2

(12) United States Patent
Enstone et al.

(10) Patent No.: US 7,872,965 B2
(45) Date of Patent: Jan. 18, 2011

(54) NETWORK RESOURCE TEAMING PROVIDING RESOURCE REDUNDANCY AND TRANSMIT/RECEIVE LOAD-BALANCING THROUGH A PLURALITY OF REDUNDANT PORT TRUNKS

(75) Inventors: Mark R Enstone, Austin, TX (US);
Michael Sean McGee, Austin, TX (US);
Darda Chang, Austin, TX (US);
Christopher L Hughes, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1399 days.

(21) Appl. No.: 11/208,690

(22) Filed: Aug. 22, 2005

(65) Prior Publication Data
US 2007/0025253 A1      Feb. 1, 2007

Related U.S. Application Data

(60) Provisional application No. 60/704,677, filed on Aug. 1, 2005.

(51) Int. Cl.
*G01R 31/08* (2006.01)
(52) U.S. Cl. ..................................................... 370/217
(58) Field of Classification Search .................. 370/389, 370/392, 463, 351, 216, 217, 218, 229, 230, 370/235, 220; 709/250, 230
See application file for complete search history.

(56) References Cited

U.S. PATENT DOCUMENTS

| | | | | |
|---|---|---|---|---|
| 6,229,538 | B1 * | 5/2001 | McIntyre et al. | 715/734 |
| 6,590,861 | B1 * | 7/2003 | Vepa et al. | 370/216 |
| 7,145,866 | B1 * | 12/2006 | Ting et al. | 370/225 |
| 2002/0018489 | A1 * | 2/2002 | Ambe et al. | 370/475 |
| 2003/0140124 | A1 * | 7/2003 | Burns | 709/220 |
| 2007/0002826 | A1 * | 1/2007 | Bennett et al. | 370/351 |

OTHER PUBLICATIONS

HP Networking Technical White Paper, "hp Proliant network adaper teaming" dated Jun. 2003.*

* cited by examiner

*Primary Examiner*—Kwang B Yao
*Assistant Examiner*—Anh Ngoc Nguyen

(57) ABSTRACT

A computer system teams its network resources by apportioning each of the resources into one of two or more groups. One or more resources make up each of the groups having a link operative to be coupled together as a port trunk to a different one of two or more coupling devices providing connectivity between the system and a network. A unique layer2 address is assigned to each one of the groups. The one or more resources of each group are programmed to receive on their group's assigned layer2 address. A response is generated to a communication request received from the network. The responses specify one of the assigned layer2 addresses.

26 Claims, 11 Drawing Sheets

NETWORK RESOURCE TEAMING PROVIDING RESOURCE REDUNDANCY AND TRANSMIT/RECEIVE LOAD-BALANCING THROUGH A PLURALITY OF REDUNDANT PORT TRUNKS

This application claims the benefit of U.S. Provisional Application No. 60/704677, filed Aug. 1, 2005.

BACKGROUND

Computers and other devices are commonly interconnected to facilitate communication among one another using any one of a number of available standard network architectures and any one of several corresponding and compatible network protocols. Packet switched network protocols are commonly employed with a number of architectures such as the Ethernet® standard. One of the most basic and widely implemented network types is the local area network (LAN). In its simplest form, a LAN is a number of devices (e.g. computers, printers and other specialized peripherals) connected to one another over a common broadcast domain using some form of signal transmission medium such as coaxial cable. Multiple LANs may be coupled together as two or more sub-networks of a more complex network via routers or equivalent devices, each of the LANs having a distinct broadcast domain.

Computers and other devices employ network resources as a requisite interface with which to communicate over a network such as a LAN. These network resources are sometimes referred to as network adapters or network interface cards (NICs). An adapter or NIC typically has at least one port through which a physical link may be provided between the processing resources of its network device and the transmission medium of a network. Data generated for transmission by the processing resources of one network device is first formatted (as packets in the case of packet switched networks) in accordance with its resident protocol layer (a software process typically executing in conjunction with the device's OS (operating system)). These packets are then framed and transmitted through the device's network resources, over the transmission media to the network resources of a second network device similarly coupled to the network. The data received by an adapter port of the second device is passed to and then deformatted by the protocol layer resident in the O/S of the second network device. The deformatted data is presented to the processing resources of the second device. The adapters or NICs are commercially available and are designed to support one or more variations of standard network architectures and known topologies, including Ethernet as described above.

In an Ethernet environment, each network device and its links to the network are identified by the other devices on the network using a protocol address (e.g. Internet Protocol (IP)) and a media access control (MAC) address in accordance with layer 3 and layer 2 of the OSI networking model respectively. The protocol address is associated with a virtual interface established by software between a device's adapter hardware and the protocol layer executed by its OS. The MAC address is uniquely associated with the adapter hardware itself and is typically hard-programmed into each device at the time of manufacture. Provision is often made such that this pre-assigned MAC address can be overwritten through software command during initialization of the device. Devices coupled to a common broadcast domain of an Ethernet network identify each other by the MAC address. Devices coupled to disparate broadcast domains communicate using their IP addresses over a device such as a router that couples the two domains.

Thus, a network device such as a server can be directly coupled to one or more physical networks or sub-networks through one or more distinct adapter ports coupled to each of the one or more networks or sub-networks. Each adapter port and its associated protocol interface are identified by a unique MAC address and IP address respectively. In the alternative, a single adapter port may be coupled to a special switch that can be programmed to provide connections to devices belonging to one or more logical sub-networks called virtual LANs (VLANs). The VLANs are essentially superimposed or overlaid on the same physical network to create multiple logical networks sharing the same physical broadcast domain. A virtual interface to the device's protocol layer is created for each of the VLANs and thus each VLAN virtual interface is assigned its own protocol address. The single adapter port, however, is still known to the devices comprising the various VLANs by a single MAC address.

To improve the reliability of a network, redundant links have been established with the same network through multiple adapter ports in the event that one of the links fails. Redundant links can also provide an opportunity to increase throughput of the connection through aggregation of the throughput through the redundant links. Redundant links to the same network can be established through multiple adapter ports coupled to a network switch for example. This is sometimes referred to as multi-homing. While providing some of the benefits of redundant links, implementation of multi-homing to achieve redundancy is difficult for reasons known to those of skill in the art.

Redundant links can also be accomplished by teaming two or more adapter ports together to appear as a single virtual link. Adapter teams are typically made up of two or more adapter ports logically coupled in parallel using a teaming driver. The teaming driver is a software routine executed by the OS that presents a common virtual interface to its protocol layer for the entire team of resources rather than individual interfaces for each adapter port as previously discussed. A single protocol address is assigned to this common virtual interface. Also, a single team MAC address is assigned to the team from the set of MAC addresses assigned to each of the adapter ports of the team. Thus, other devices on the network see the team of adapter ports as a single virtual adapter port.

The throughput of the individual port members of the team can be aggregated for data transmitted from and received by the network device employing the team, depending upon the nature of the team configured. Throughput aggregation is commonly optimized using one of a number of known load-balancing algorithms, executed by the teaming driver, to distribute frames between the teamed NIC ports. The use of aggregated teamed adapter ports also inherently provides fault tolerance because the failure of one of the aggregated links does not eliminate the entire link. The aggregation of network interface resources through teaming is particularly beneficial in applications such as servers, as the demand for increased throughput and reliability of a network connection to a server is typically high.

Teams of network resources can be of various types providing different benefits. Network fault tolerant (NFT) teams commonly employ two or more network adapter or NIC ports redundantly coupled to the same network through a switch. One port is configured to be "active" and is designated as the "primary" adapter port. Each of the remaining members of the team is placed in a "standby" or "inactive" mode and is designated as a "secondary" member of the team. The primary adapter port is assigned a team MAC address from the set of MAC addresses associated with each of the team members. The secondary members are each assigned one of the remaining MAC addresses of the set. A NIC port in standby mode remains largely idle (it is typically only active to the limited extent necessary to respond to system test inquiries to indicate that it is still operational) until activated in a failover process. Failure detection and failover processes are typically executed by the teaming driver. Failover replaces the failed primary adapter port with one of the secondary team members, rendering the failed adapter port idle and secondary while activating one of the secondary adapters and designating it as the new primary for the team. In this way, interruption of a network connection to a critical server may be avoided notwithstanding the existence of a failed network adapter card or port.

Transmit load-balanced (TLB) teams typically aggregate and load-balance data transmitted from two or more active members of the team to other devices over the network in accordance with some load-balancing policy executed by the teaming driver. Several types of load-balancing algorithms may be employed with the teaming driver typically executing the algorithm. As with the NFT teams described above, only one of the active team members is designated as the primary for the team. Because the primary is the only member of the team that has been assigned the team MAC address, and this single MAC address is the one by which all devices on the network communicate with the team, it necessarily handles all of the data received by the team from the network. As a result, no aggregation of the receive traffic is available. TLB teams are particularly useful in applications where the transmit traffic is significantly greater than the traffic received by the team. One such application is a database server that provides data to a large number of clients in response to a relatively smaller amount of request traffic generated by those clients.

Switch-assisted load-balanced (SLB) teams are able to aggregate both transmit and receive data over all active team members. This is accomplished through a special switch interposed between the team and the network that has the intelligence to create a single virtual port for all of the physical ports coupling the team adapters and the switch. In this case, no adapter is designated as the primary and each team adapter is assigned the same team MAC address. The switch recognizes all packets it receives containing the team MAC address as being destined for the virtual port. The switch routes each such packet to one of the port members of the virtual port based on a load-balancing algorithm executed by the switch. The transmit data is typically load-balanced by the teaming driver in the manner used for TLB teams. SLB teams also provide fault tolerance by default, as team members that cease to function as a result of a fault will be inactivated and only the aggregated throughput of the team will be reduced as a result.

Certain network configurations are designed to achieve redundancy of connections between a system and the network using multiple coupling devices such as switches. Switch redundant configurations coupled to a server employing redundant links using a TLB or NFT team can result in members of the adapter team being coupled to the network through a different one of the redundant switches (and thus through separate paths of the network). To ensure that all team members are coupled to the same broadcast domain (i.e. same layer-2 network or subnet), these switch-redundant configurations require that all of the redundant devices (and therefore the team members) ultimately be interconnected in some way—either directly or by way of uplinks to a common third device (e.g. a backbone or core switch).

BRIEF DESCRIPTION OF THE DRAWINGS

For a detailed description of embodiments of the invention, reference will now be made to the accompanying drawings in which.

NOTATION AND NOMENCLATURE

Figure 1:
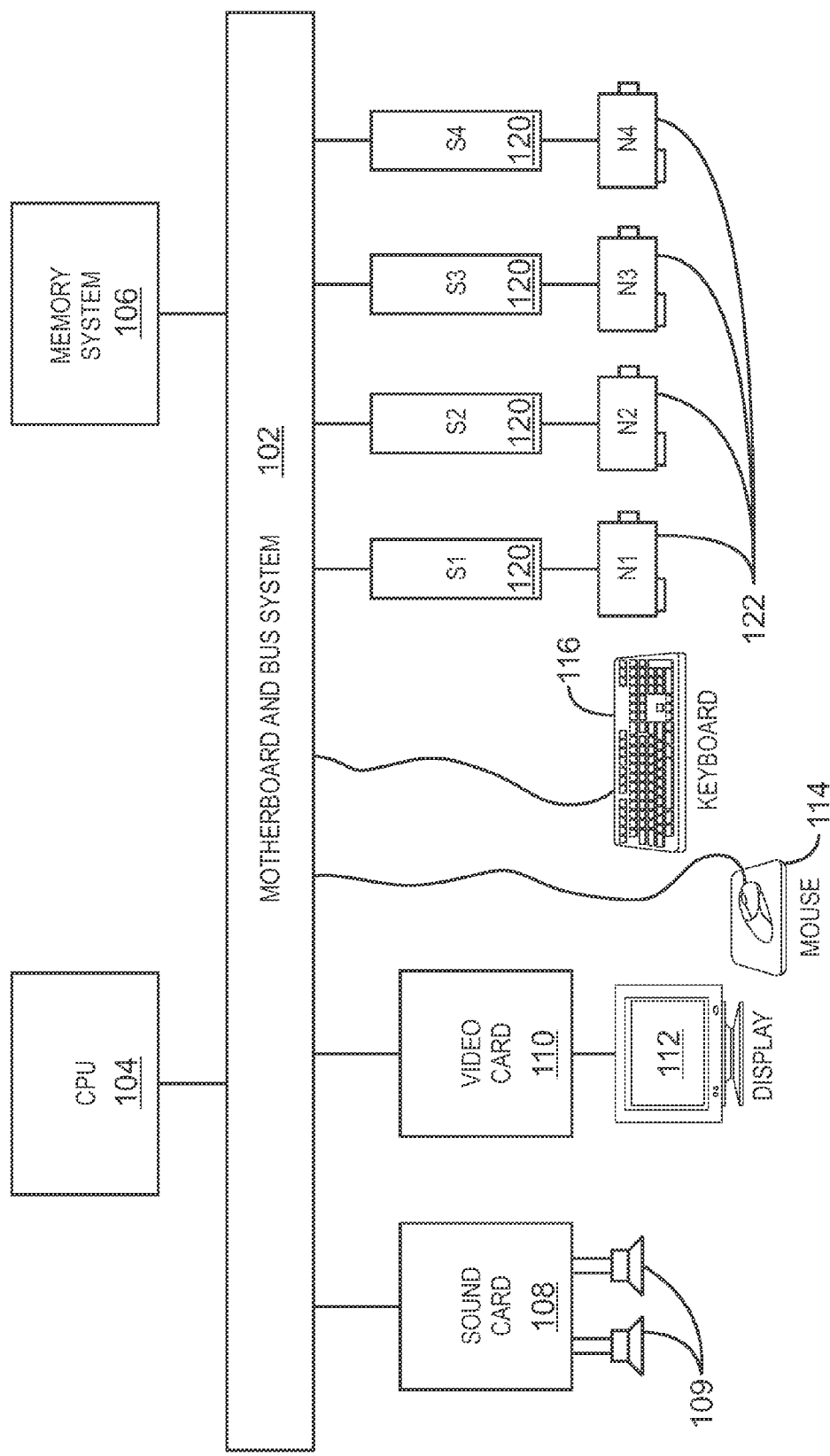
FIG. 1 is a block diagram that illustrates various features of a computer system, including some features by which the computer system is coupled to a network in accordance with an embodiment of the present invention.

Certain terms are used throughout the following description and in the claims to refer to particular features, apparatus, procedures, processes and actions resulting therefrom. For example, the term network resources is used to generally denote network interface hardware such as network interface cards (NICs) and other forms of network adapters known to those of skill in the art. Moreover, the term NIC or network adapter may refer to one piece of hardware having one port or several ports. While effort will be made to differentiate between NICs and NIC ports, reference to a plurality of NICs may be intended as a plurality of interface cards or as a single interface card having a plurality of NIC ports. Those skilled in the art may refer to an apparatus, procedure, process, result or a feature thereof by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . ."

DETAILED DESCRIPTION

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to intimate that the scope of the disclosure, including the claims, is limited to that embodiment. For example, while the various embodiments may employ one type of network architecture and/or topology, those of skill in the art will recognize that the invention(s) disclosed herein may be readily applied to all other compatible network architectures and topologies as known to those of skill in the art.

Heretofore, load-balancing of data received by a team of network resources has employed a switch that implements one of a number of port-trunking algorithms that were originally developed for load balancing traffic transmitted between switches. These switches treat their ports as a single virtual trunk by routing received data to any one of their ports in accordance with the load-balancing algorithm. This SLB team of resources is therefore treated by the switch as if the team is coupled to it over a single virtual port trunk. Data received by the switch and destined for the team can be distributed to any member of the team by way of any of the output ports making up the trunk to which the members are coupled. One of the limitations of this technique is that all team members must be coupled to the same SLB (i.e. port-trunking capable) switch and thus, the same virtual port trunk.

Because splitting the resources of an SLB team between different switches is not permitted using conventional port-trunking techniques, users have been forced to choose between the benefits of network redundancy and settling for a TLB or NFT team, or they have had to forego switch redundancy to achieve receive traffic aggregation and load-balancing. Embodiments of the invention as described below permit users to realize the benefits of redundant connections to a network (e.g. eliminating single points of failure), as well as to achieve greater receive throughput through receive aggregation and load-balancing of resources coupled to each of the redundant connections.

FIG. 1 is a block diagram of a computer system 100 that illustrates various features of a computer system 100 that may be used to couple it to a network in accordance with an embodiment of the present invention. The computer system 100 can be an industry standard server or any computer or peripheral system that can be coupled to a network, and may include a motherboard and bus system 102 coupled to at least one central processing unit (CPU) 104, a memory system 106, a video card 110 or the like, a mouse 114 and a keyboard 116. The motherboard and bus system 102 can be any kind of bus system configuration, such as any combination of the following: a host bus, one or more peripheral component interconnect (PCI) buses, an industry standard architecture (ISA) bus, an extended ISA (EISA) bus, a microchannel architecture (MCA) bus, etc. Also included but not shown are bus driver circuits and bridge interfaces, etc., as are known to those skilled in the art.

The CPU 104 can be any one of several types of microprocessors and can include supporting external circuitry typically used in industry standard servers, computers and peripherals. The types of microprocessors may include the 80486, Pentium®, Pentium II®, etc. all microprocessors from Intel Corp., or other similar types of microprocessors such as the K6® microprocessor by Advanced Micro Devices. Pentium® is a registered trademark of Intel Corporation and K6® is a registered trademark of Advanced Micro Devices, Inc. Those of skill in the art will recognize that processors other than Intel compatible processors can also be employed. The external circuitry can include one or more external caches (e.g. a level two (L2) cache or the like (not shown)). The memory system 106 may include a memory controller or the like and may be implemented with one or more memory boards (not shown) plugged into compatible memory slots on the motherboard, although any memory configuration is contemplated. The CPU 104 may also be a plurality of such processors operating in parallel.

Other components, devices and circuitry may also be included in the computer system 100 that are not particularly relevant to embodiments of the present invention and are therefore not shown for purposes of simplicity. Such other components, devices and circuitry are typically coupled to the motherboard and bus system 102. The other components, devices and circuitry may include an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc.

The computer system 100 may further include one or more output devices, such as speakers 109 coupled to the motherboard and bus system 102 via an appropriate sound card 108, and monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as is known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration, as further described below. It will be appreciated that different combinations of such input/output and peripheral devices may be used in various combinations and forms depending upon the nature of the computer system.

The motherboard and bus system 102 is typically implemented with one or more expansion slots 120, individually labeled S1, S2, S3, S4 and so on, where each of the slots 120 is operable to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots known to those of skill in the art, such as PCI, ISA, EISA, MCA, etc. In an embodiment illustrated in FIG. 1, a plurality of NIC adapter cards 122, individually labeled N1, N2, N3 and N4 each providing a single adapter port are shown coupled to the respective slots S1-S4. The bus interconnecting slots 120 and the NICs 122 is typically dictated by the design of the adapter card itself.

As described more fully below, each of the NICs 122 enables the computer system to communicate through at least one port with other devices on a network to which the MC ports are coupled. The computer system 100 may be coupled to at least as many networks as there are NICs (or NIC ports) 122. When multiple NICs or NIC ports 122 are coupled to the same network as a team, each provides a separate and redundant link to that same network for purposes of load balancing and/or fault tolerance. Additionally, two or more of the NICs (or NIC ports) 122 may be split between distinct paths or segments of a network that ultimately connect to a core switch.

Figure 2:
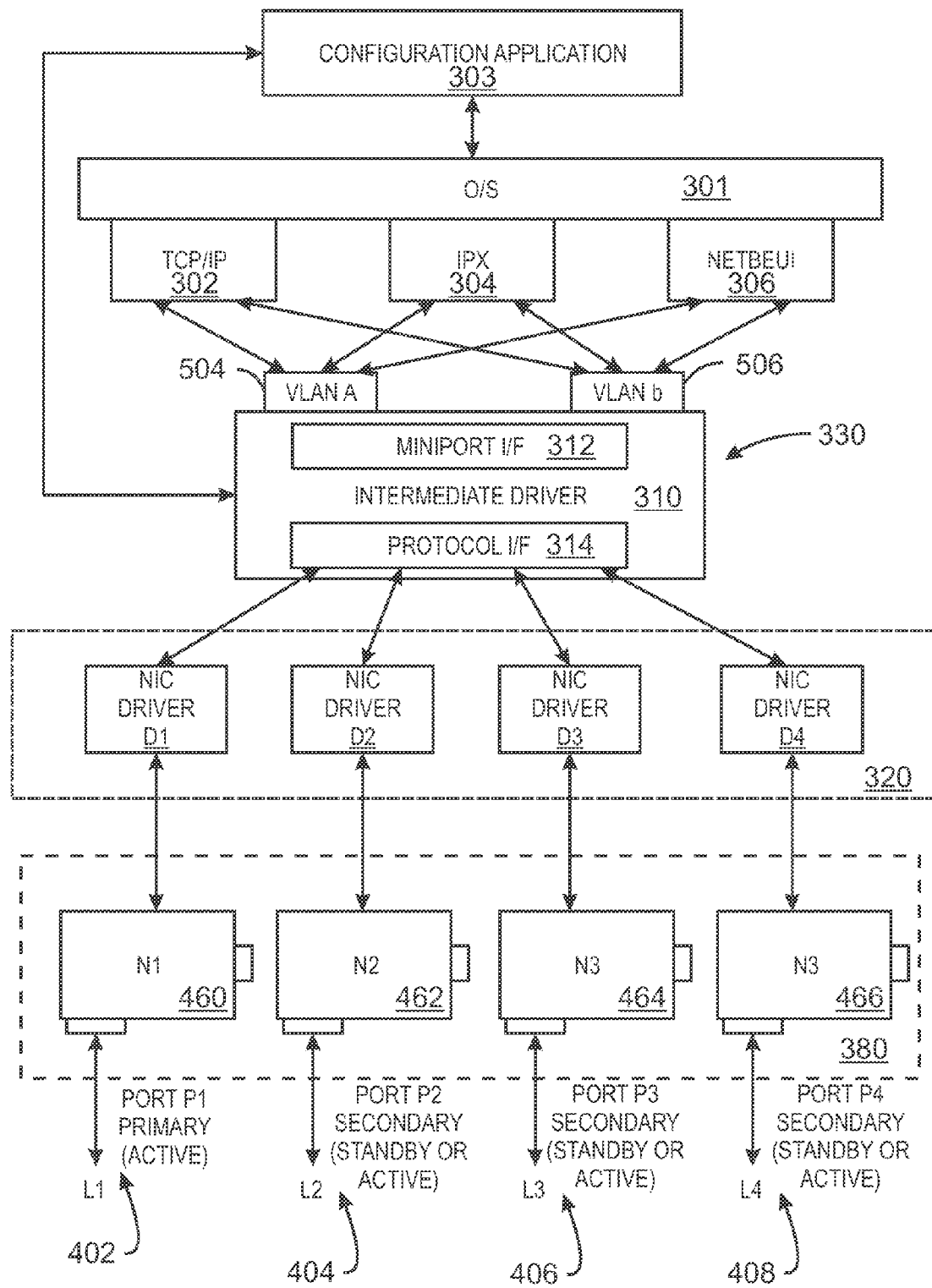
FIG. 2 is a block diagram of a network that illustrates some features that may be used to couple the computer system of FIG. 1 to the network in accordance with an embodiment of the present invention.

A more detailed discussion regarding a teaming mechanism that may be used to implement an embodiment of the invention is now presented with reference to FIG. 2. As previously mentioned, for a team of network adapter ports to operate as a single virtual adapter, all devices on the network must communicate with the team using only one layer-2 address and one layer-3 address. Put another way, a network device must see only one layer-2 (e.g. MAC) address and one protocol address (e.g. IP, IPX) for a team, regardless of the number of adapter ports that make up the team. For Ethernet networks, devices that wish to communicate with one another must first ascertain the MAC address for each device in accordance with the address resolution protocol (ARP). The requesting device issues an ARP request for a particular IP address, and the device assigned to that IP address recognizes the request is directed to it and responds to the requesting device with its MAC address. The requesting device stores that MAC address in association with the IP address in an ARP table it maintains. The IP protocol address of a team will have only one entry in the requesting device's ARP table (i.e. one MAC address and one IP address) for the entire team.

The computer system 100 of FIG. 2 is configured with four NICs Ni 460 through N4 466, each providing one NIC port 402-408. Each NIC port has a corresponding instantiation of the appropriate drivers D1, D2, D3 and D4 for purposes of illustration. Each instantiation of a driver D1 through D4 is the driver necessary to control each the corresponding ports. The computer system 100 has installed within it an appropriate operating system (O/S) 301 that supports networking, such as Microsoft NT, Novell Netware, Windows 2000, or any other suitable network operating system. The O/S 301 includes, supports or is otherwise loaded with the appropriate software and code to support one or more communication protocols, such as TCP/IP 302, IPX (Internet Protocol exchange) 304, NetBEUI (NetBIOS (NETwork Basic Input/Output System) Extended User Interface) 306, etc. A configuration application program 303 runs in conjunction with O/S 301.

An embodiment of configuration application 303 provides a graphical user interface (GUI) through which users may program configuration information regarding the initial teaming of the NICs. Additionally, the configuration application 303 receives current configuration information from the teaming driver 310 that can be displayed to the user using the first GUI on display 112, including the status of the resources for its team (e.g. "failed," "standby" and/or "active"). Techniques for graphically displaying teaming configurations and resource status are disclosed in detail in U.S. Pat. No. 6,229,538 entitled "Port-Centric Graphic Representations of Network Controllers," which is incorporated herein in its entirety by this reference. Application 303 provides commands by which the resources can be allocated to teams and reconfigured. A user can interact with the configuration program 303 through the GUIs via one or more input devices, such as the mouse 114 and the keyboard 116 and one or more output devices, such as the display 112. It will be appreciated that the GUI can be used remotely to access configuration program 303, such as over a local network or the Internet for example.

A hierarchy of layers within the O/S 301, each performing a distinct function and passing information between one another, enables communication with an operating system of another network device over the network. For example, four such layers have been added to Windows 2000: the Miniport I/F Layer 312, the Protocol I/F Layer 314, the Intermediate Driver Layer 310 and the Network Driver Interface Specification (NDIS) (not shown). The Protocol I/F Layer 314 is responsible for protocol addresses and for translating protocol addresses to MAC addresses. It also provides an interface between the protocol stacks 302, 304 and 306 and the NDIS layer. The drivers for controlling each of the network adapter or NIC ports reside at the Miniport I/F Layer 312 and are typically written and provided by the vendor of the network adapter hardware. The NDIS layer is provided by Microsoft, along with its O/S, to handle communications between the Miniport Driver Layer 312 and the Protocol I/F Layer 314.

To accomplish teaming of a plurality of network adapters, an instance of an intermediate driver residing at the Intermediate Driver Layer 310 is interposed between the Miniport Driver Layer 312 and the NDIS. The Intermediate Driver Layer 310 is not really a driver per se because it does not actually control any hardware. Rather, the intermediate driver causes the miniport drivers for each of the NIC ports to be teamed to function seamlessly as one virtual driver 320 that interfaces with the NDIS layer. For each team of NIC adapter ports, there will be a separate instance of the intermediate driver at the Intermediate Driver Layer 310, each instance being used to tie together those NIC drivers that correspond to the NIC ports belonging to that team. Each instance of a teaming driver presents a single virtual interface to each instance of a protocol (302, 304 and or 306) being executed by the O/S 301. That virtual interface is assigned one IP address. If the server is configured with VLANs (e.g. VLANs A 504 and B 506), virtual interfaces for each VLAN are presented to the protocol layer, with each VLAN having been assigned its own unique protocol address.

The intermediate driver 310 also presents a single protocol interface to each of the NIC drivers D1-D4 and the corresponding NIC ports 402, 404, 406 and 408 of NICs N1 460, N2 462, N3 464, and N4 466. Because each instance of the intermediate driver 310 can be used to combine two or more NIC drivers into a team, a user may configure multiple teams of any combination of the ports of those NICs currently installed on the computer system 100. By binding together two or more drivers corresponding to two or more ports of physical NICs, data can be transmitted and received through one of the two or more ports (in the case of an NFT team) or transmitted through all of the two or more ports and received through one for a TLB team), with the protocol stacks interacting with what appears to be only one logical device.

As previously discussed a fault tolerant team is typically employed where the throughput of a single NIC port is sufficient but fault tolerance is important. As an example, the NIC ports 402, 404, 406 and 408, providing redundant links L1 through L4 to a network can be configured as a network fault tolerance (NFT) team. For an NFT team, one of the NIC ports (e.g. port 402 of N1 460) is initially assigned as the primary and NIC N1 460 is placed in the "active" mode. This assignment can be accomplished by default (e.g. the teaming driver 310 simply chooses the team member located in the lowest numbered slot as the primary member and assigns it the team MAC address) or manually through the GUI and configuration application 303. For the NFT team, ports 404, 404, 406 and 408 are designated as "secondary" and their respective NICs N2 462, N3 464 and N4 466 are placed in a "standby" mode.

The primary team member transmits and receives all packets on behalf of the team. If the active link (i.e. L1) fails or is disabled for any reason, the computer system 100 (the teaming driver 310 specifically) can detect this failure and switch to one of the secondary team members by rendering it the active (and primary) member of the team while placing the failed member into a failed mode until it is repaired. This process is sometimes referred to as "failover" and involves reassigning the team MAC address to the NIC port that is to be the new primary. Communication between computer system 100 and devices in a network to which the team is coupled is thereby maintained without any significant interruption. Those of skill in the art will recognize that an embodiment of an NFT team can have any number of redundant links in an NFT team, and that one link of the team will be active and all of the others will be in standby.

Figure 3:
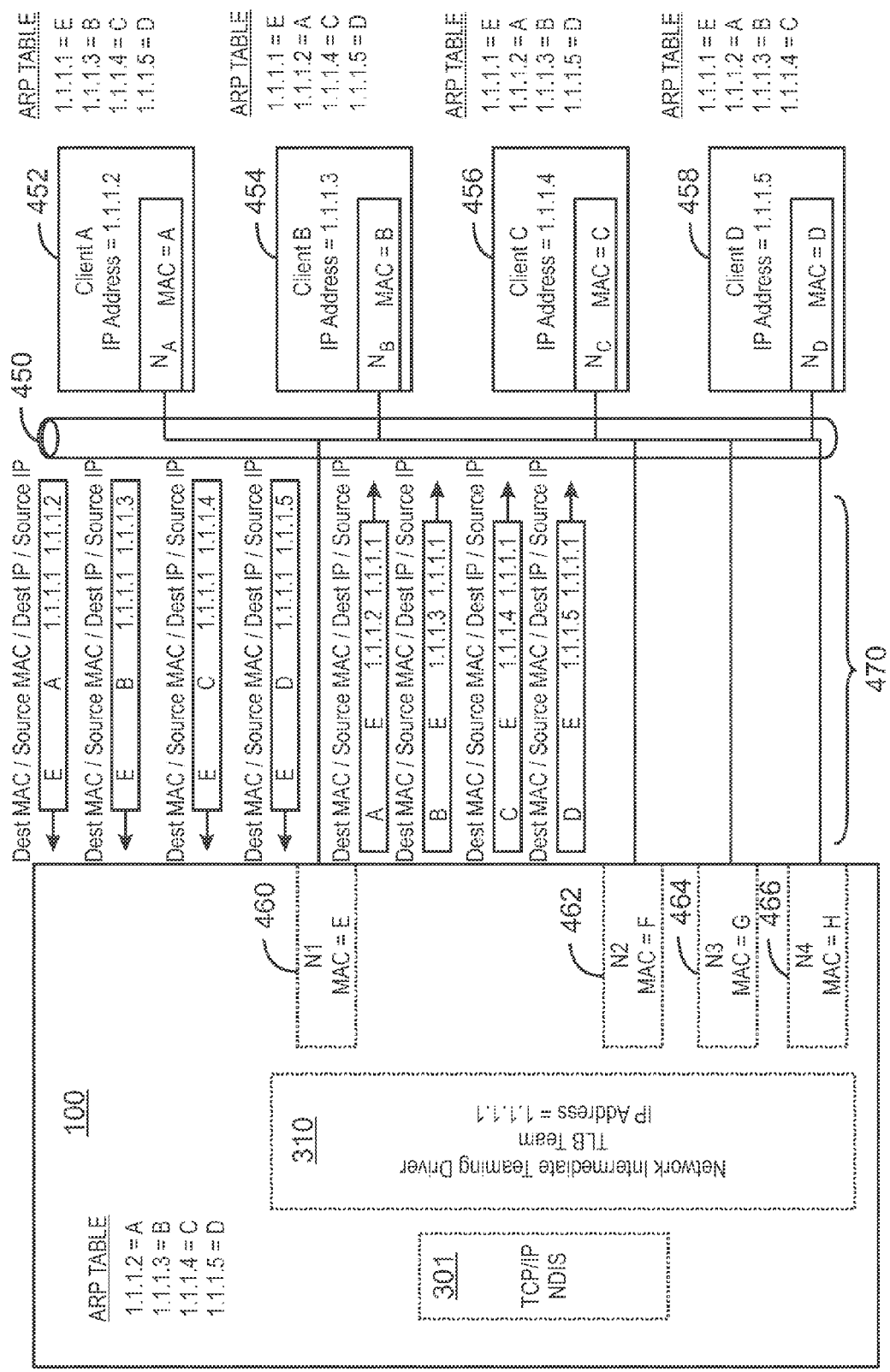
FIG. 3 is a block diagram illustrating the traffic flow of an embodiment of an NFT team.

FIG. 3 illustrates the traffic flow 470 between the network resources NICs N1-N4, configured as an NFT team) and a network 450 through which client devices A 452, B 454, C 456 and D 458 communicate with server 100. The team MAC address is E and has been assigned to NIC N1 460, the primary member of the team. All of the other resources are secondary members and are placed in standby mode until needed. Thus, primary NIC N1 460 transmits all traffic to the clients and receives all traffic from the clients. One of the members of the team will be activated only in the event that NIC N1 460 fails, at which time it will be assigned the team MAC address E and as such becomes the primary for the team. The team is recognized as a single virtual device as indicated by the single entry for system 100 in the respective ARP tables of client devices A 452, B 454, C 456 and D 458.

The network resources NICs N1 460, N2 462, N3 464, and N4 466 of FIG. 2 can also be configured as a TLB team. Transmit load balancing (TLB) teams are typically employed when fault tolerance is desired as well as data throughput greater than that available through the single primary resource of an NFT team. This is common for situations such as when the computer system 100 is acting as a database server and its primary role is to transmit data to numerous clients. In this example, its receive throughput requirements are significantly less than its transmit throughput requirements and the receive throughput requirements can be handled by the primary adapter alone. For a TLB team, the primary (i.e. port 402 of NIC 460) is again operable to send and receive data. The difference between the two team types is that for an NFT team, the secondary team members are in standby mode and the primary does all of the transmitting and receiving for the team, whereas for a TLB team the primary does all of the receiving and the secondary members are active for transmitting but not receiving. For the details of techniques by which the system 100 can detect NIC failure and then initiate and perform a failover, please see U.S. Pat. No. 6,272,113 entitled "Network Controller System that uses Multicast Heartbeat Packets," which was issued on Aug. 7, 2001.

Figure 4A:
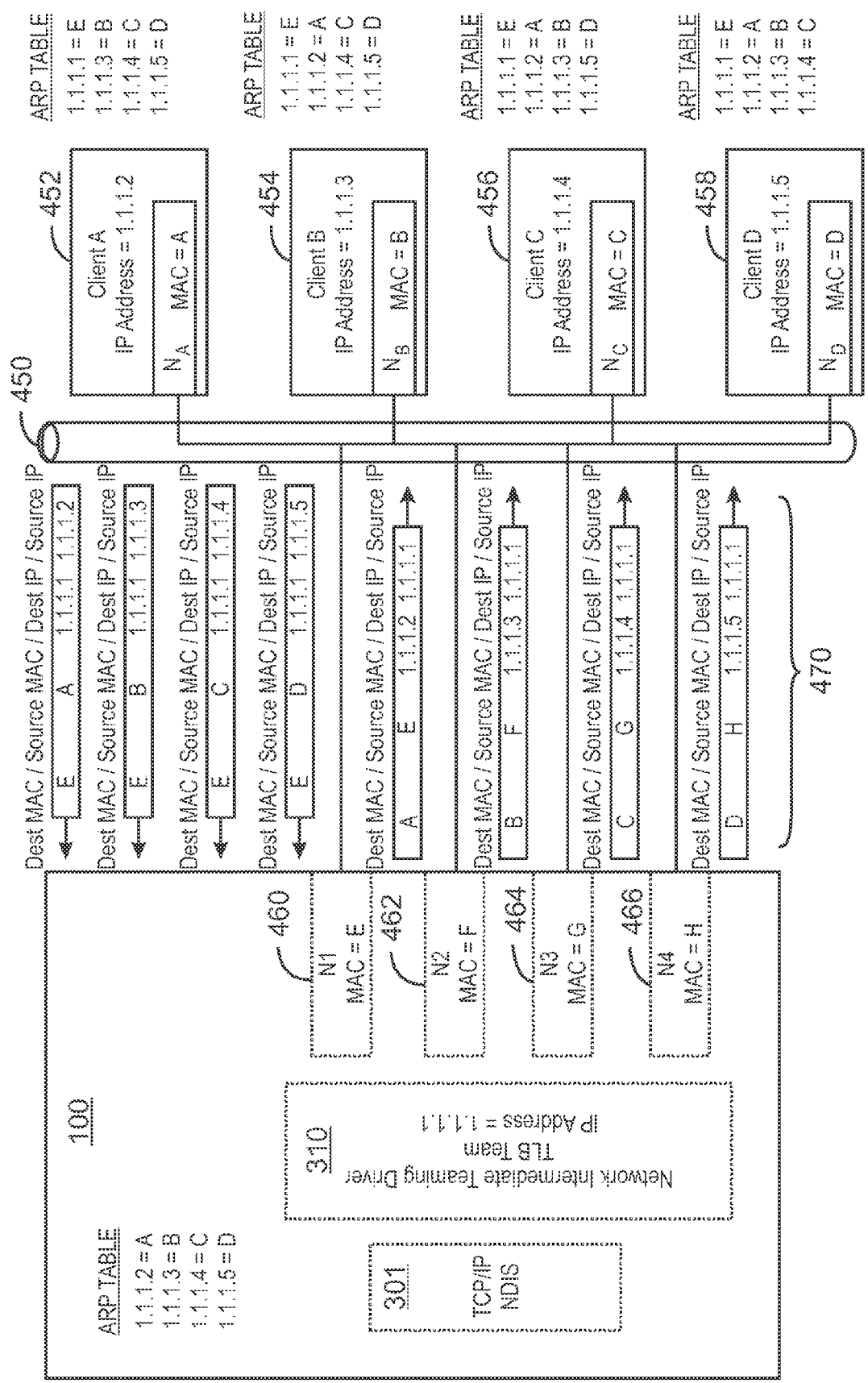
FIG. 4A is a block diagram illustrating the traffic flow of an embodiment of a TLB team.

FIG. 4A illustrates the traffic flow 470 between a TLB team and a network 450 by which the client devices A 452, B 454, C 456 and D 458 communicate with server 100. The team MAC address is E and has been assigned to NIC N1 460, the primary member of the team. All of the other resources are secondary members and are active to transmit data only. Once again, if the primary NIC N1 460 fails, one of the other secondary members is assigned the team MAC address E and is enabled to receive data transmitted by the clients to the team MAC address E. Data transmitted by the team is load-balanced between the new primary, as well as the remaining secondary members that are still functioning. Again, the client devices A 452 , B 454, C 456 and D 458 see the team of resources NICs N1-N4 as a single virtual device as indicated by the single entry (i.e. IP address 1.1.1.1; MAC address E) for system 100 in their respective ARP tables.

As can be seen from FIG. 4A, each active member (i.e. not failed) of the team transmits data with its own MAC address. This is not a problem for Ethernet networks employing IP as its network protocol because all source MAC addresses are stripped from packets by the receiving network devices and only the source team IP address is used to respond back to the team. For networks employing IPX as a protocol, this is not an issue because the source MAC address is embedded within the IPX protocol address. During an ARP request to the team, however, only the team MAC address is returned to the requesting device and is stored in its ARP table as indicated.

Figure 4B:
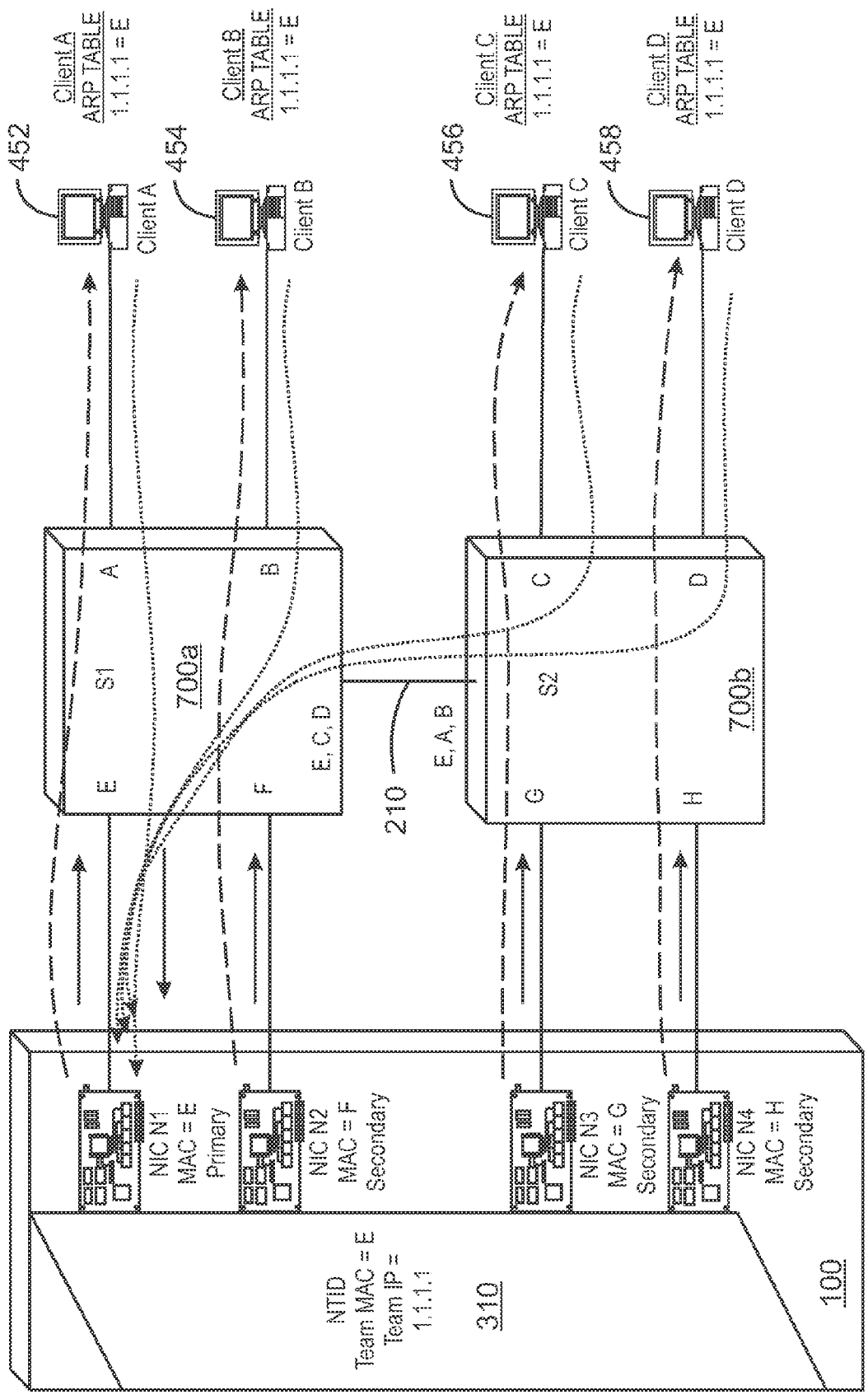
FIG. 4B is a block diagram of the TLB team of FIG. 4A within a redundant network topology.

FIG. 4B illustrates the application of the TLB team of FIG. 4A within a network topology wherein two redundant connections to a network are provided. For this topology, the team members can be split between the redundant switches S1 700a and S2 700b providing the redundant connections between system 100 and the network. This redundant switch topology is often implemented to avoid a single point of failure with respect to the network's interface to a server, for example. In this example, team NICs N1 and N2 are coupled to a core of the network (not shown) through redundant switch S1 700a. Team NICs N3 and N4 are coupled to the core network through redundant switch S2 700b. Each switch can also couple a plurality of local client devices to the system 100 as represented by Clients A 452 and B 454 (switch S1 700a) and Clients C 456 and D 458 (switch S2 700b). In the example of FIG. 4B, NIC N1 is designated to be the TLB team primary and as such is assigned the team MAC address E. The TLB team operates as previously described, with all team members transmitting load-balanced data and only the primary member receiving data. The clients and the core network see the team as a single virtual device with a single MAC address.

It should be noted that the example of FIG. 4B illustrates a load-balancing algorithm (residing within and executed by the teaming driver 310) that balances data based on either a destination MAC address or IP address (i.e. on a conversation-by-conservation basis). In this example, the conversations currently assigned to each team member happen to be with clients directly coupled to the switch to which each NIC is also directly coupled. Those of skill in the art will recognize that it is possible that load-balancing assignments could also occur that might require team members to transmit data for conversations to a client not directly coupled to the switch to which the team member is coupled. In that case, transmitted data would also flow between the switches over switch cross-connect 210 or through a core switch (not shown) coupling the S1 700a and S2 700b to the core network.

Figure 5A:
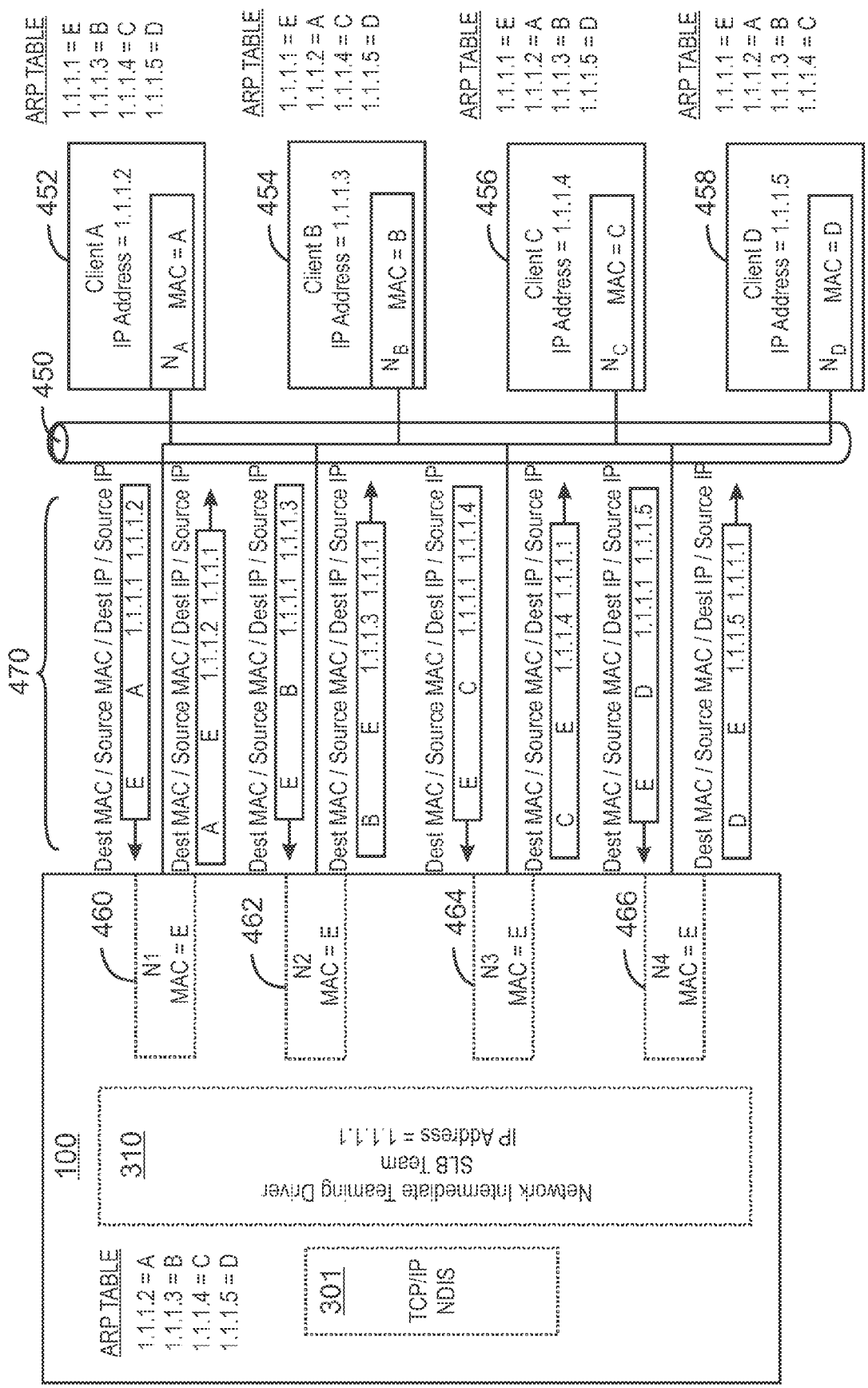
FIG. 5A is a block diagram illustrating the traffic flow of an embodiment of an SLB team.

As previously discussed, switch-assisted load balancing (SLB) teams can provide not only load balancing of transmitted data, but also load-balancing of data received by the team. To implement this team type, a switch that is operative to perform port-trunking can be employed to load-balance the data received by the switch for the team. There are numerous port trunking algorithms known to those of skill in the art, including Cisco's EtherChannel and Hewlett-Packard's ProCurve for example. FIG. 5A illustrates the traffic flow 470 from an SLB team through a network 450 through which client devices A 452, B 454, C 456 and D 458 communicate with server 100. The team MAC address=E and has been assigned to all NICs N1 460, N2 462, N3 464, and N4 466 and the clients A 452, B 454, C 456 and D 458 still see the SLB team as a single virtual resource as indicated by the single entry for the team in their respective ARP tables. All of the resources are therefore active to transmit data as well as to receive data addressed to the team MAC address=E. The switch (not shown) sees the links L1-L4 corresponding to NICs N1-N4 as a virtual port trunk. A Switch (not shown) distributes data frames it receives from clients addressed to team MAC address E to any one of the active team members in accordance with the implemented load-balancing algorithm. In this case, all active members of the team transmit using the team address as well. Should any of the team members fail, the team continues to operate as described, albeit with a reduced bandwidth.

Figure 5B:
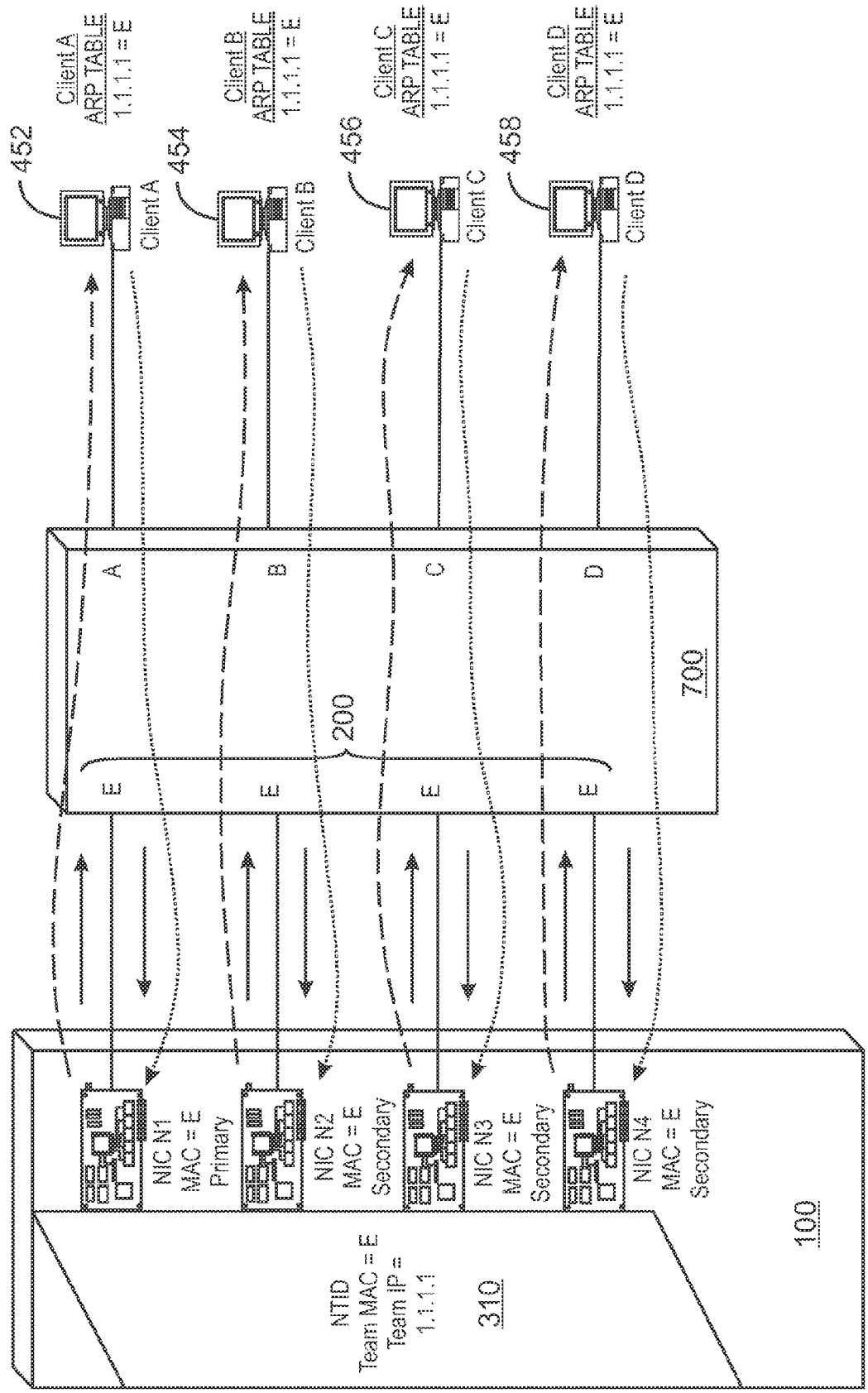
FIG. 5B is a block diagram of the SLB team of FIG. 5A within a single-switch network topology.

FIG. 5B illustrates data flow for an application of the SLB team of FIG. 5A including a switch 700 that is enabled for port trunking (i.e. treating its output ports coupled to each of the team members as a single virtual trunk). Consistent with the requirements of an SLB team, all team members NIC N1-N4 are coupled to the switch 700. There is no team member designated to be primary, as is the case for TLB and NFT teams as previously described. All team members are enabled to receive data addressed to MAC address E and they all send data using the same MAC address. The switch 700 sees all of its ports coupled to one of the team members as a single virtual port 200, and any of the frames addressed to the team address MAC=E can be output to the team on anyone of the ports of the virtual port 200 in accordance with the load-balancing algorithm employed by the switch.

Previously, an SLB team was limited to the non-redundant topology of FIG. 5B, and implementation of redundant topologies such as that of FIG. 4B were limited to implementation only with TLB or NFT teams. With features of the present invention incorporated within system 100, and particularly within teaming driver 310 and configuration program 303, topologies can now be handled that provide both redundant connectivity as well as aggregated receive throughput on each of those redundant connections, while still being operative to provide the topologies of FIGS. 4B and 5B. A more detailed discussion of the features of the present invention and the expanded teaming capabilities permitted by them are now presented with reference to FIGS. 6A-B, 7 and 8.

Figure 6A:
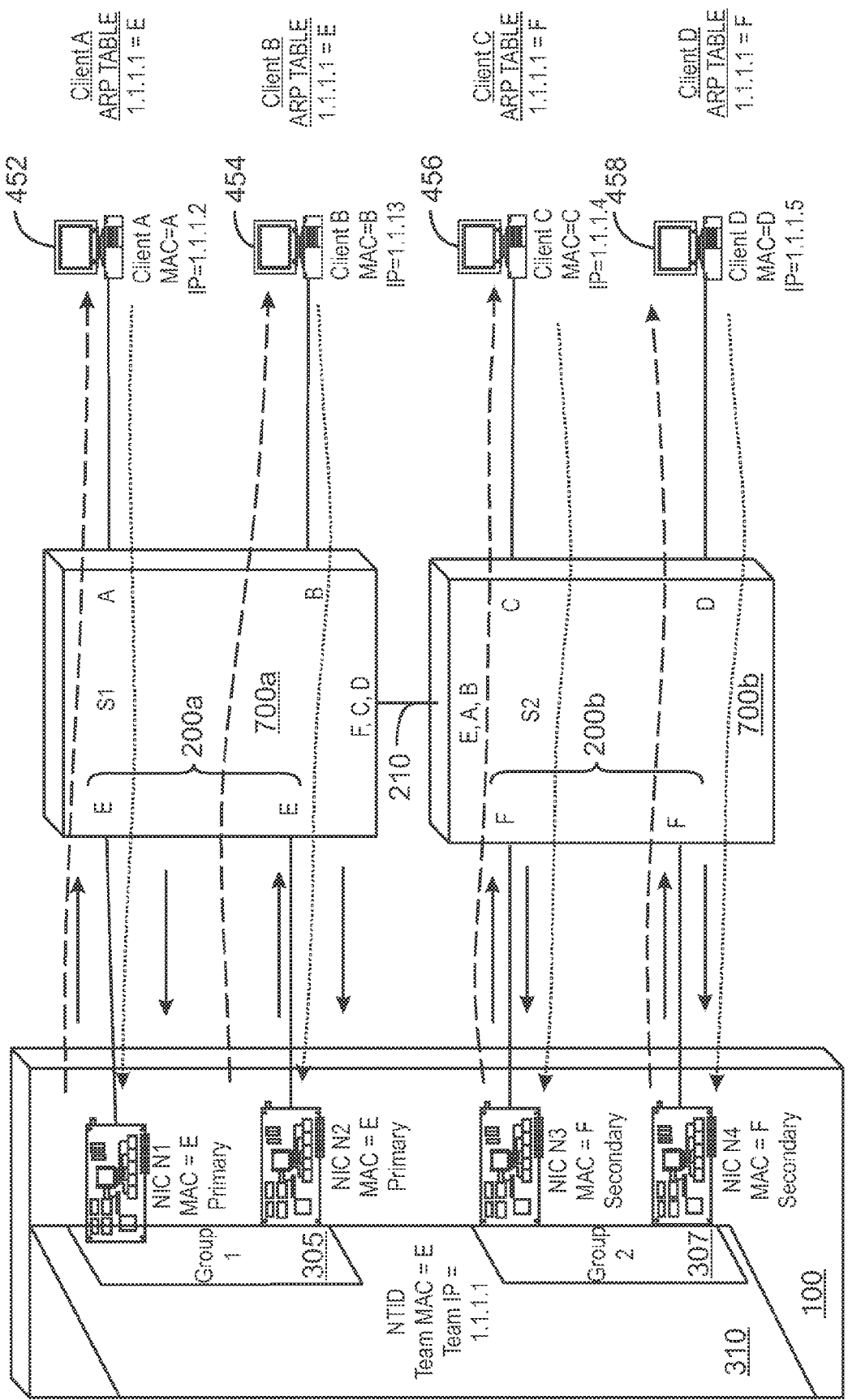
FIG. 6A illustrates an embodiment of a network teaming configuration having an SLB team coupled to each redundant switch of a network in accordance with the present invention.

FIG. 6A illustrates a network topology of an embodiment of the invention wherein the team is coupled to the switch redundant topology employed with the TLB team of FIG. 4B. In the embodiment, both of the switches S1 700a and S2 700b are port-trunking enabled switches operative to perform any port-trunking algorithm that can be used to support switch assisted load balancing (SLB). In response to instructions from the configuration program 303, the teaming driver groups the resources N1-N4 in accordance with the network connection switches to which they are coupled. In this example, Group1 305 is established as those NICs coupled to switch 700a and Group2 307 is includes those NICs coupled to Switch 700b. In the example embodiment of FIG. 6A, Group 1 305 is assigned the team MAC address=E. Group2 307 is assigned a different MAC address=F. The teaming driver programs the unicast MAC address table of each the NICs in the group to receive data over a MAC address it assigns to the group. In the example, NICs N1 and N2 are programmed to receive data addressed to the team MAC address=E and NICs N3 and N4 are programmed to receive data addressed to MAC address=F. The NICS of each group also transmit using their respectively assigned MAC addresses. It will be appreciated that a switch having only one NIC in its group need not be operative to perform port trunking.

In an embodiment, system 100 receives ARP requests broadcast by the Clients A 452, B 454, C 456 and D 458 that specifies the team IP address for the system 100 (in the example of FIG. 6A, an IP address=1.1.1.1 has been assigned to the team of NICS N1-N4) and seeks a MAC address with which to communicate with system 100. Conventionally, the teaming driver 310 receives this request over all of its NICs and passes this request up to the protocol stack residing in the O/S 301 of the system 100. Conventionally, the protocol stack of system 100 generates a response to the ARP request that specifies the team MAC address=E. In an embodiment, the teaming driver 310 can either permit the ARP response to be transmitted as was generated by the protocol stack, or it can intercept the ARP response prior to transmission and substitute the MAC address assigned to one of the groups other than the one assigned the team MAC address (e.g. MAC=F for Group2 307, FIG. 6A). In the example, if the ARP response is permitted to pass unchanged by the teaming driver 310, the Client to which the response is directed will communicate with system 100 through switch 700a and NICs N1 and N2 of Group1 305. Should the teaming driver 310 intercept the ARP response and substitute MAC address=F into the frame, the Client to which the response is directed will communicate with the system 100 through switch 700b and through the NICs N3 and N4 of Group2 307.

In either case, the data received over each of the two switches is receive load-balanced between the NICs of the group to which it is coupled. Moreover, the teaming driver 310 can load-balance the connections established among the groups in accordance with some predetermined algorithm. The teaming driver 310 is able to decide in real time whether or not to intercept ARP responses destined for the Clients A 452, B 454, C 456 and D 458 and to direct communication to one of the groups not assigned the team MAC address. Additionally, the teaming driver 310 is still able to transmit load-balance data transmitted from the system 100 to the network and Clients A 452, B 454, C 456 and D 458 over the members of each group that can be used for standard TLB teams.

Figure 6B:
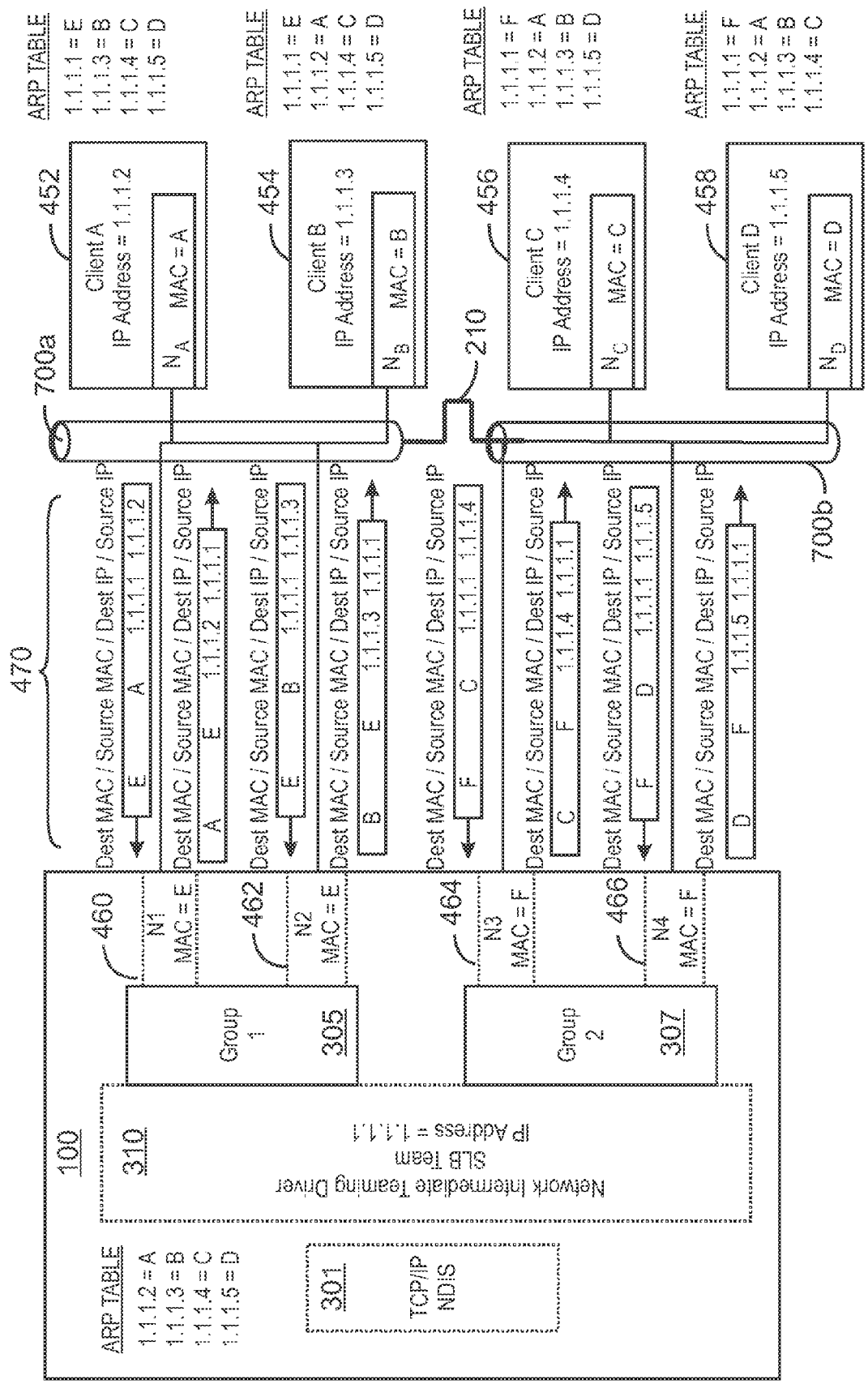
FIG. 6B illustrates an embodiment of a data flow diagram of the teaming configuration of FIG. 6A.

FIG. 6B is a diagram illustrating the data flow for an embodiment of the teaming topology of FIG. 6A. It will be appreciated that the system 100 will also broadcast its own ARP requests when it is necessary for the system 100 to initiate a conversation with a device in the network. Those of skill in the art will recognize that boxes Group1 305 and Group2 307 are simply abstract constructs to identify the additional processing that occurs within the teaming driver 310 to intercept and process frames through the individual groups where there was previously no distinction.

It will be appreciated by those of skill in the art that when the system generates an ARP request, it broadcasts its team MAC address as part of the process. As a result of this broadcast operation, the Clients A 452, B 454, C 456 and D 458 will update their ARP tables accordingly to reflect only the team MAC address=E. This is true even if the client was previously communicating with a group assigned to a non-team MAC address. The ARP entries in an ARP table, however, expire within a predetermined time and upon expiration, a client must re-ARP for a MAC address to maintain a connection to the system 100. This process is designed into most networks to ensure that the connections are refreshed periodically and the time to expiration is typically programmable. As a result, once an ARP broadcast by the system 100 has caused all connections to be established such that they communicate over the group to which the team MAC address has been assigned, the teaming driver is able to eventually balance them back out over the groups as the ARP table entries expire and are renewed. It will be appreciated that the time for this re-balancing to occur can be minimized by programming a minimum entry expiration time.

Figure 7:
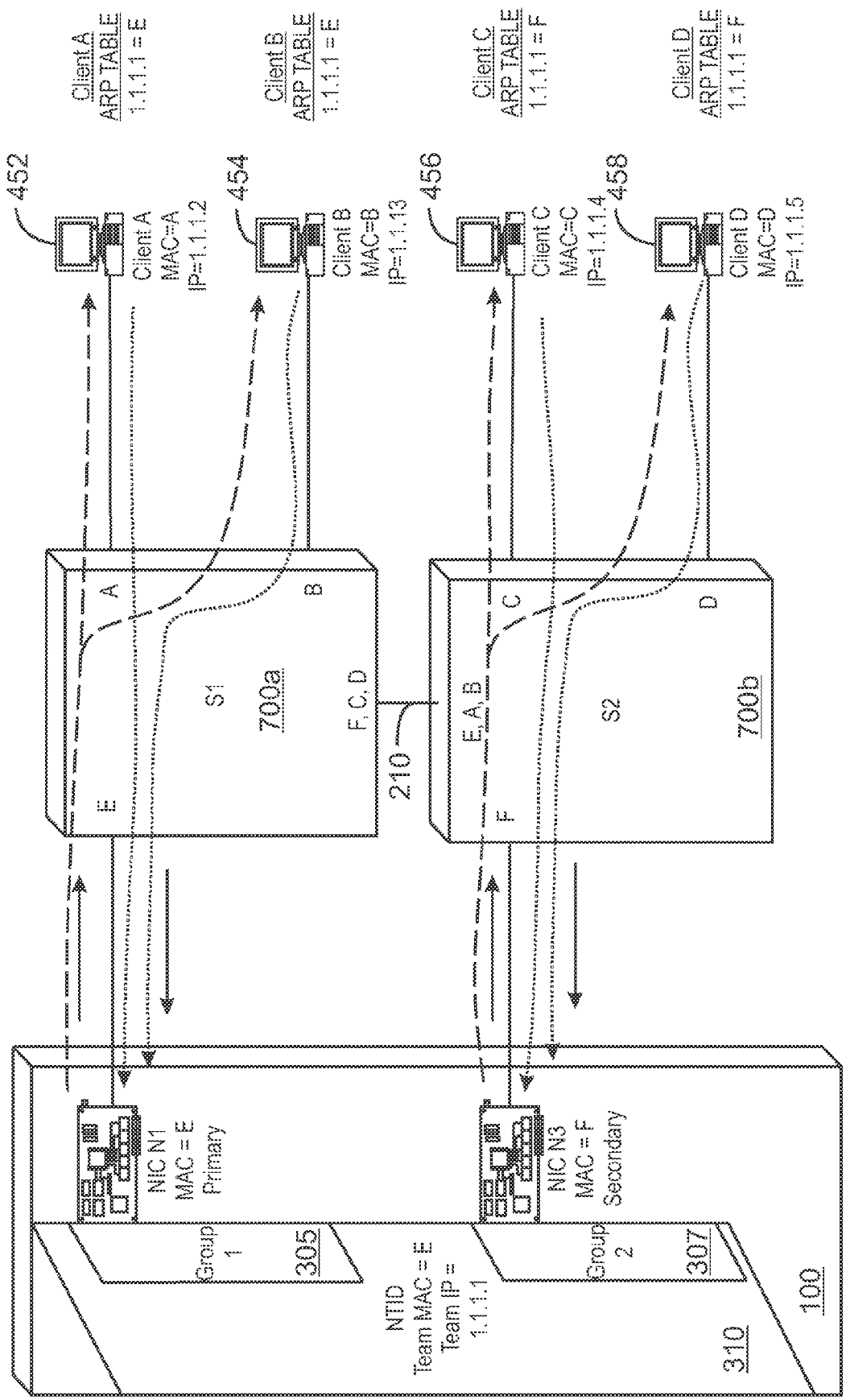
FIG. 7 illustrates an embodiment of a minimal configuration for the network teaming configuration of FIG. 6A in accordance with the present invention.

Those of skill in the art will appreciate that the ARP intercept technique of the present invention permits two or more distinct SLB teams to be created within a single team of NIC resources where this was not possible before. Although only two switches and thus two groups have been illustrated in FIGS. 6A and 6B, it will be appreciated that there are no limits to the number of groups and thus the number of redundant links to the network that can deployed using this technique. Moreover, there is no requirement that the groups have the same number of resources allocated to each. FIG. 7 illustrates an embodiment wherein only one NIC is assigned to each group. In this case, the switches need not be enabled for port trunking. Nevertheless, assigning the two individual NICs to different groups permits the ARP intercept and the balancing process performed by teaming driver 310 to assign two different MAC addresses to each group and thus provides the benefit of receiving data on both trunks, rather than just the one, such as with standard TLB teams. In this case, the ARP intercept operates in the same manner as described above for groups with multiple resources and that are SLB load-balanced.

In an embodiment, a user can manually configure the team into groups and identify which of the teams should be assigned which MAC addresses through a user interface (e.g. graphical user interface (GUI)) and configuration program (303, FIG. 2). The decision can be based on such factors as, for example total receive throughput in a group, which of the paths is initially deemed most optimal, etc. Thus, it may be desirable to assign a group with higher throughput to the team MAC address because it is best able to temporarily accommodate all connections right after a system ARP takes place. In still another embodiment, an automated configuration process could be employed that makes this decision based on a set of configuration rules and the current status and configuration of the network to which the team is coupled. An automated teaming configurator is disclosed in U.S. application Ser. No. 11/048,524 entitled "Dynamic Allocation and Configuration of a Computer System's Network Resources," which is incorporated herein in its entirety by this reference.

Should one of the NICs fail in one of the groups of FIGS. 6A-B, the team continues to function as described for a standard SLB team except for the loss of receive throughput within the group (of course, the overall team will lose some transmit throughput as well. The teaming driver 310 can compensate for the loss of receive throughput in a particular group by biasing its processing of ARP responses to route more receive data through a group having greater aggregated receive throughput. This is also true should changing network conditions favor a group coupled to a more optimal path to the core network. The teaming driver can be programmed manually or automatically assign more NICs to the group coupled to the optimal path. An optimal path detection technique is disclosed in U.S. application Ser. No. 11/048,520 entitled "Automated Selection of an Optimal Path between a Core Switch and Teamed Network Resources of a Computer System," which is incorporated herein in its entirety by this reference.

Figure 8:
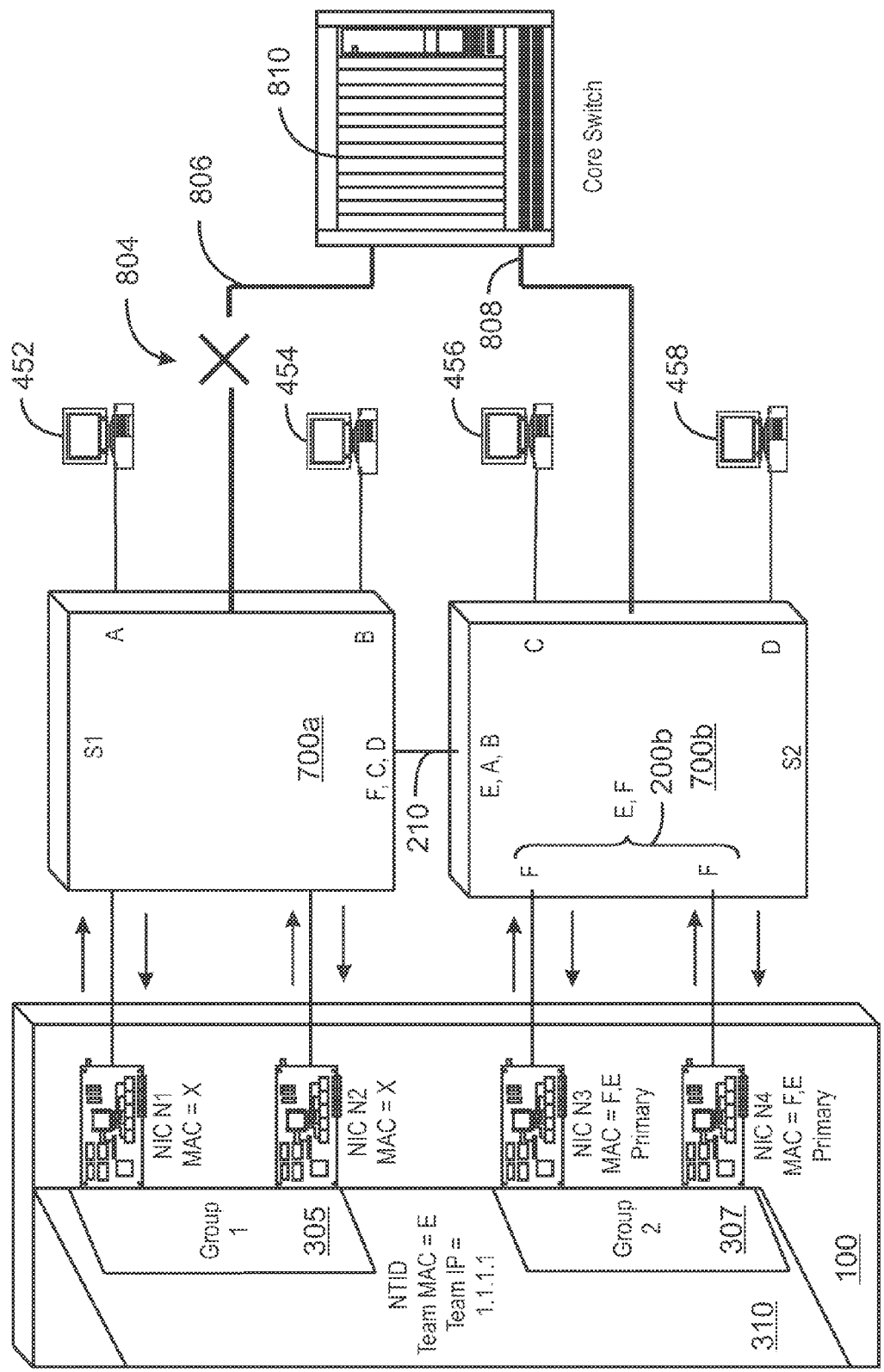
FIG. 8 is an embodiment of a failover process in accordance with the present invention.

FIG. 8 illustrates a partial loss of connectivity to the core of the network due to failure 804 in uplink 806. As a result, those devices in the core of the network that have been instructed to use the MAC address=E by the teaming driver 310 to communicate with system 100 through switch 700a are unwittingly cut off from the team and thus server 100. When the teaming driver 310 senses this isolation (such a group disconnect could also be the result of a loss of all members of the group as well as an inoperative switch 700a), it can program NICs in one or more other groups to receive over the MAC address formerly assigned to the isolated group. Thus, as illustrated in the example of FIG. 8, Group2 307 NICs N3 and N4 have been enabled to receive on both MAC=E and MAC=F for so long as the group level fault remains unresolved for Group1 305. This ensures that communication will not be interrupted for those Clients that have been given the MAC address assigned to the failed group.

Techniques for detecting and recovering from split segment conditions such as that illustrated in FIG. 8 are disclosed in U.S. patent application Ser. No. 11/048,523 entitled "Automated Recovery from a Split Segment Condition in a Layer2 Network for Teamed Network Resources of a Computer System," which is incorporated herein in its entirety by this reference. It will be appreciated that one of the consequences typically encountered in a split segment condition, isolation of the server from the core network when communication with the primary NIC has been cut off, is not an issue when configuring the team as a team of SLB teams. That is because although segments become split, each segment is coupled by a distinct group having its own MAC address with which to transmit data to the server.

It should be noted that the monitoring processes mentioned above which look for particular frames to be received by particular NICs of the team do not work for the conventional SLB topology of FIGS. 5A and 5B. For example, using heartbeat frames to detect individually failed NICs or NIC ports does not work because it is not possible to detect through which of the NICs specifically the heartbeat frame was received when received by a standard SLB team. Likewise, techniques for monitoring network status such as in detecting split segments or optimal paths as described in the cited applications above are not applicable to the conventional SLB team of FIGS. 5A and 5B because of the inability to split the resources of the SLB team of FIG. 5 between redundant links to the network. It will be appreciated that through use of an SLB team for each redundant virtual port trunk to the network as illustrated in FIGS. 6A-B, 7 and 8, the monitoring techniques can be elevated to the group level. Put another way, the frames which are monitored by the teaming driver can be used to validate the group as long as at least one member of the team receives the frame being monitored.

Embodiments of the invention enable network users to combine the benefits of receive load-balancing while achieving the benefits of redundant network topologies. Through a system's teaming configuration program interface, users can assign network resources (manually or automatically) of a system such as a server to two or more groups. Each group includes at least one of the resources and is coupled to a different one of multiple network devices (e.g. switch) to provide redundant links between the system and the network. The groups of one or more resources are configured as distinct SLB teams, although groups of one resource do not require their switch be port-trunking enabled.

A primary group is assigned the team MAC address, and the remaining groups are each assigned their own unique MAC addresses. Each resource in the group is programmed to transmit and receive using its group MAC address. Switches to which all groups having two or more resources are programmed for port trunking. The teaming driver intercepts none, some or all of the responses generated by the system's protocol stack and inserts the MAC addresses of other groups in accordance with a predetermined load-balancing algorithm. In this way, each group becomes an independent SLB team within the team as a whole, and receive load-balancing can be implemented for each of the redundant switches coupling the team as a whole to the network.

It should be noted that while FIGS. 3, 4A-B, and 5A-B illustrate topologies configurable by previous incarnations of the teaming driver 310 and configuration program 303, the teaming driver and configuration program of the present invention are considered incorporated within the embodiments illustrated by those FIGS. for purposes of illustration as the teaming driver 310 and configuration program 303 embodying features of the present invention are still capable of configuring those topologies as well as those topologies illustrated in FIGS. 6A-B and 7-8.

What is claimed is:

1. A method of teaming network resources of a computer system comprising:

apportioning via a processor each of the one or more network resources into one of two or more groups, the one or more resources of each of the groups having a link operative to be coupled together as a port trunk to a different one of two or more coupling devices providing connectivity between the system and a network;

assigning via a processor a unique layer2 address to each one of the groups, wherein one of the assigned layer2 addresses is a team layer2 address, and wherein said assigning further comprising programming the one or more resources of each group to receive on the group's assigned layer2 address;

generating via a processor a response to a communication request received from the network, the response specifying the team layer2 address; and intercepting the generated response and substituting one of the assigned layer2 addresses for the team layer2 address.

2. The method of claim 1 further comprising load-balancing data transmitted from the system to the network over all of the resources independent of the group to which they belong.

3. The method of claim 1, wherein said intercepting and said substituting is performed in accordance with a predetermined load-balancing algorithm.

4. The method of claim 1 wherein said assigning further comprises enabling each of the coupling devices that is coupled to one of the two or more groups comprising at least two resources to load balance data received from the network among the at least two resources of the group.

5. The method of claim 1, further comprising failing over, said failing over further comprising:

detecting the failure of one of the groups to receive a predetermined frame type; and enabling the one or more resources of at least one of the other of the two or more groups to receive on the layer2 address assigned to the failed group.

6. The method of claim 5 wherein said failing over is in response to a loss of connectivity between the failed group and a core of the network.

7. The method of claim 5 wherein said failing over is in response to a condition wherein a receive path to the group assigned the team layer2 address is less optimal than a receive path between the core and the different at least one group.

8. The method of claim 1 wherein said assigning and said apportioning is performed manually by user through a GUI (graphical user interface).

9. The method of claim 1 wherein said assigning and said apportioning is performed by a configurator in accordance with one or more predetermined rules for said assigning and said apportioning.

10. The method of claim 5 wherein said failing over is initiated by a configurator in accordance with one or more predetermined rules for said failing over.

11. A method of teaming network resources of a computer system comprising:

apportioning via a processor each of the network resources into one of two or more groups of the resources, the one or more resources of each of the groups having a link operative to be coupled together as a port trunk to a different one of two or more coupling devices providing connectivity between the system and a network;

assigning via a processor a unique layer2 address to each one of the groups wherein one of the assigned addresses is a team layer2 addresses, said assigning further comprising programming the one or more resources of each group to receive on their group's assigned layer2 address; and generating via a processor a response to a communication request received from the network, the response specifying one of the assigned layer2 addresses wherein:

the response specifies the team layer2 address; and said generating further comprising intercepting the generated response prior to transmission and substituting a different one of the assigned layer2 addresses for the team layer2 address.

12. The method of claim 11 wherein said intercepting and said substituting are performed in accordance with a predetermined load-balancing algorithm.

13. The method of claim 11 further comprising load-balancing data transmitted from the system to the network over all of the resources independent of the group to which they belong.

14. A computer system comprising a plurality of network resources, said computer system further comprising:

means for apportioning each of the one or more network resources into one of two or more groups, the one or more resources of each of the groups having a link operative to be coupled together as a port trunk to a different one of two or more coupling devices providing connectivity between the system and a network;

means for assigning a unique layer2 address to each one of the groups, wherein one of the assigned layer2 addresses is a team layer2 address, and wherein said means for assigning further comprising programming the one or more resources of each group to receive on the group's assigned layer2 address; and means for responding to a communication request received from the network, the response specifying the team layer2 address; and means for intercepting the generated response and means for substituting one of the assigned layer2 addresses for the team layer2 address.

15. The computer system of claim 14 further comprising means for load-balancing data transmitted from the system to the network over all of the resources independent of the group to which they belong.

16. The computer system of claim 14, wherein said means for intercepting and said means for substituting is performed in accordance with a predetermined load-balancing algorithm 17. The computer system of claim 14 wherein said means for assigning further comprises means for enabling each of the coupling devices that is coupled to one of the two or more groups comprising at least two resources to load balance data received from the network among the at least two resources of the group.

18. The computer system of claim 14, further comprising means for failing over, said means for failing over further comprising:

means for detecting the failure of one of the groups to receive a predetermined frame type; and means for enabling the one or more resources of at least one of the other of the two or more groups to receive on the layer2 address assigned to the failed group.

19. The computer system of claim 18 wherein said means for failing over responds to a loss of connectivity between the failed group and a core of the network.

20. The computer system of claim 18 wherein said means for failing over responds to a condition wherein a receive path to the group assigned the team layer2 address is less optimal than a receive path between the core and the different at least one group.

21. The computer system of claim 14 wherein said means for assigning and said means for apportioning are receive input manually from user through a GUI (graphical user interface).

22. The computer system of claim 14 wherein said means for assigning and said means for apportioning receive input from a configurator automatically in accordance with one or more predetermined rules.

23. The computer system of claim 19 wherein said means for failing over responds to input from a configurator in accordance with one or more predetermined rules.

24. A computer system comprising a plurality of network resources, said computer system further comprising:
  means for apportioning each of the network resources into one of two or more groups of the resources, the one or more resources of each of the groups having a link operative to be coupled together as a port trunk to a different one of two or more coupling devices providing connectivity between the system and a network;
  means for assigning a unique layer2 address to each one of the groups wherein one of the assigned addresses is a team layer2 addresses, said assigning further comprising programming the one or more resources of each group to receive on their group's assigned layer2 address;
  means for responding to a communication request received from the network, the response specifying one of the assigned layer2 addresses, wherein:
    the generated response specifies the team layer2 address; and
    said means for responding further comprising means for intercepting the generated response prior to transmission and substituting a different one of the assigned layer2 addresses for the team layer2 address.

25. The computer system of claim 24 wherein said means for intercepting and said means for substituting is performed in accordance with a predetermined load-balancing algorithm

26. The computer system of claim 24 further comprising means for load-balancing data transmitted from the system to the network over all of the resources independent of the group to which they belong.

* * * * *

UNITED STATES PATENT AND TRADEMARK OFFICE
CERTIFICATE OF CORRECTION

PATENT NO.         : 7,872,965 B2                                         Page 1 of 1
APPLICATION NO.    : 11/208690
DATED              : January 18, 2011
INVENTOR(S)        : Mark R. Enstone et al.

It is certified that error appears in the above-identified patent and that said Letters Patent is hereby corrected as shown below:

In column 16, line 52, in Claim 16, after "algorithm" insert -- . --.

In column 18, line 20, in Claim 25, after "algorithm" insert -- . --.

Signed and Sealed this
Nineteenth Day of April, 2011

David J. Kappos
*Director of the United States Patent and Trademark Office*